United States Patent [19]
Mansour et al.

[11] Patent Number: 6,034,683
[45] Date of Patent: Mar. 7, 2000

[54] TIME LINE FOR DESKTOP METAPHOR

[75] Inventors: Steven F. Mansour, Milpitas, Calif.;
German W. Bauer, Garches, France

[73] Assignee: Netscape Communications Corporation, Mountain View, Calif.

[21] Appl. No.: 08/878,749

[22] Filed: Jun. 19, 1997

Related U.S. Application Data

[63] Continuation-in-part of application No. 08/825,210, Mar. 26, 1997, Pat. No. 5,877,759.

[51] Int. Cl.⁷ .................................................... G06F 3/14
[52] U.S. Cl. ......................... 345/339; 345/347; 345/963
[58] Field of Search ...................... 345/339, 347, 345/348, 349, 350, 351, 326, 963

[56] References Cited

U.S. PATENT DOCUMENTS

| | | | |
|---|---|---|---|
| 5,129,057 | 7/1992 | Strope et al. | 345/348 |
| 5,307,086 | 4/1994 | Griffin et al. | 345/146 |
| 5,323,314 | 6/1994 | Baber et al. | 345/349 X |
| 5,365,360 | 11/1994 | Torres | 345/348 |
| 5,428,736 | 6/1995 | Kahl et al. | 345/339 |
| 5,491,626 | 2/1996 | Williams et al. | 345/963 X |
| 5,500,938 | 3/1996 | Cahill et al. | 345/326 |
| 5,528,745 | 6/1996 | King et al. | 345/326 |
| 5,664,063 | 9/1997 | Johnson et al. | 345/963 X |
| 5,748,927 | 5/1998 | Stein et al. | 345/333 |
| 5,874,965 | 2/1999 | Takai et al. | 345/357 |
| 5,877,759 | 3/1999 | Bauer | 345/339 |

*Primary Examiner*—Crescelle N. dela Torre
*Attorney, Agent, or Firm*—Michael A. Glenn

[57] ABSTRACT

An interface for scheduling temporal events is provided in the form of a time line associated with a desktop metaphor. The interface comprises a clock representation in any of several formats that is associated with a display, where the clock has a first display configuration that is integrated into an electronic desktop in a seamless and consistent fashion, and that represents a most minimized state of the scheduling interface. The clock also has one or more additional display configurations that represent expanded states to provide a time line representation of such items scheduled events, related documentation, participant identity, and resource management tools.

20 Claims, 13 Drawing Sheets

TIME LINE FOR DESKTOP METAPHOR

This patent application is a continuation-in-part of patent application Ser. No. 08/825,210, filed Mar. 26, 1997, now U.S. Pat. No. 5,877,759.

BACKGROUND OF THE INVENTION

1. TECHNICAL FIELD

The invention relates to the scheduling of temporal events. More particularly, the invention relates to a time line for a desktop metaphor.

2. DESCRIPTION OF THE PRIOR ART

Time is variously defined as a nonspatial continuum in which events occur in apparently irreversible succession from the past through the present to the future; an interval separating two points on this continuum; a duration; a number, as of years, days, or minutes, representing such an interval; a similar number representing a specific point on this continuum, reckoned in hours and minutes; and a system by which such intervals are measured or such numbers are reckoned. (Source: American Heritage Dictionary, Third Edition (1993)).

By any definition, time management and scheduling is a major undertaking that, in itself, is increasingly time consuming. While many systems exist for time management and scheduling, none of these systems integrate time management and scheduling into the now ubiquitous electronic desktop. For example, personal information managers (PIMs) may provide a desktop resident time and scheduling resource, but such PIMs are typically independent applications that are in no way integrated into the system on which they run, let alone a network. Group scheduling software is also known, but requires that each member of the group use the same scheduling application. Further, such group scheduling software does not include functionality beyond that of simple scheduling, i.e. it does not provide sharing of documents pursuant to a meeting. Rather, such functionality must be provided by additional dedicated applications, such as work group applications which are largely unitary and homogenous.

However, in the real world, people interact in a disjoint and heterogenous fashion, scheduling meetings with persons in other locations, other companies, and other time zones, where such meetings may involve any of several topics keyed to specific documentation. Task-based, autonomous time management, if available, would provide a powerful tool for simplifying human interaction and time management.

Another limitation of present day time management and scheduling solutions is the manner in which they are integrated into the electronic desktop. While a time bar may be shown as part of a window, such time displays are limited vis-a-vis relative time, e.g. time of day, day at a glance, and time zone differentiation, and are further limited solely to time management and scheduling, i.e. they do not incorporate such functionality as intranet and Internet access, smart agents, or extended features, such as word processing, email, and database access/management. Thus, the time function is, as yet, not fully integrated into the electronic desktop in a seamless and transparent fashion, especially in a fashion that integrates and exploits the full functionality of the local system on which it resides, and any network to which the system is connected.

Such limitations are found in the art due to a perspective that views time management and scheduling as an independent function that may be optionally addressed in a stand-alone manner. It would be advantageous to provide a time management and scheduling user interface that is centered on autonomous processing of whole tasks rather than sequences of commands, as well as the autonomous detection of contexts which require the launch of a process, where such context is time-based.

SUMMARY OF THE INVENTION

The invention provides an interface for scheduling temporal events. The interface is provided in the form of a time line associated with a desktop metaphor. The interface comprises a clock representation in any of several formats that is associated with a display, where the clock has a first display configuration that is integrated into an electronic desktop in a seamless and consistent fashion, and that represents a most minimized state of the scheduling interface. The clock also has one or more additional display configurations that represent expanded states to provide a time line representation of such items scheduled events, related documentation, participant identity, and resource management tools.

DETAILED DESCRIPTION OF THE INVENTION

The invention provides an interface for the scheduling application.

Figure 1:
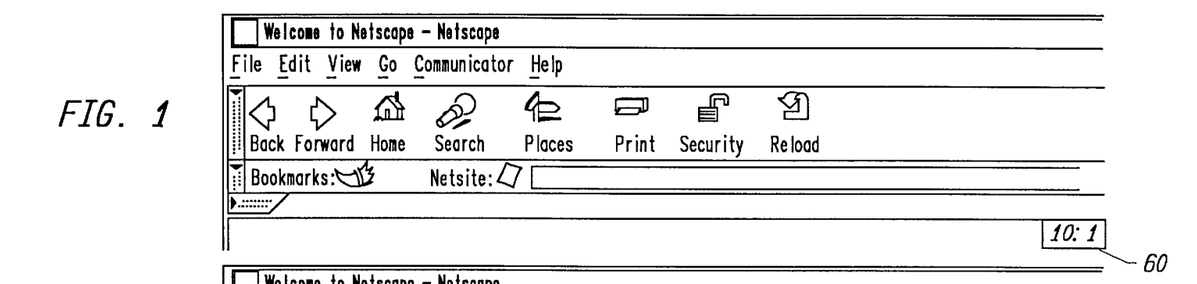
FIG. 1 is a schematic representation of a browser during a start situation according to the invention.

FIG. 1 is a schematic representation of a browser during a start situation according to the invention. When the user has logged into the system, s/he is greeted with a clock 60 at the edge of the display. This clock represents the most minimized state of the scheduling application. It displays the local time for that user.

Figure 2:
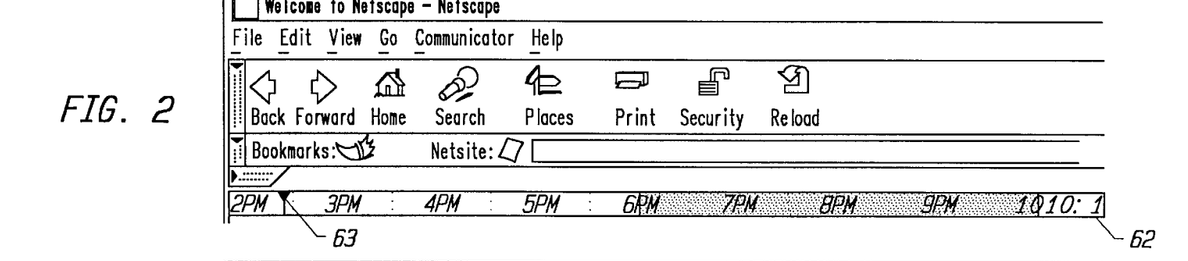
FIG. 2 is a schematic representation of a browser in which the view is expanded to show the time line according to the invention.

FIG. 2 is a schematic representation of a browser in which the view is expanded to show the time line according to the invention. By clicking on the clock 60 the view can be expanded to reveal a time line 62 stretching across the screen. The triangle 63 at the left side represents current time, the time line moves underneath. Highlighted bars at the bottom are visible that convey information about upcoming events.

Figure 3:
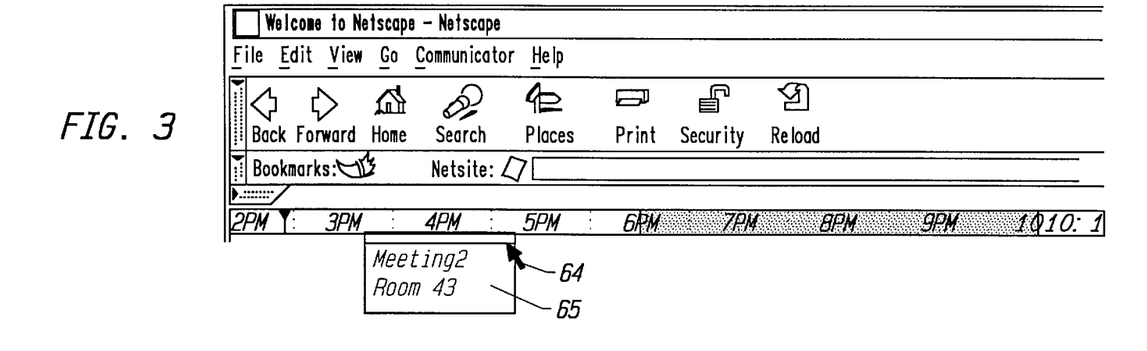
FIG. 3 is a schematic representation of a browser in which an inquiry is made about single events according to the invention.

FIG. 3 is a schematic representation of a browser in which an inquiry is made about single events according to the invention. By moving the cursor over any particular event line, the event information 65 for that event pops to the foreground. This also happens when an event is due, e.g. 15 minutes before a meeting starts. This is to remind that user that the event is to take place soon.

Figure 4:
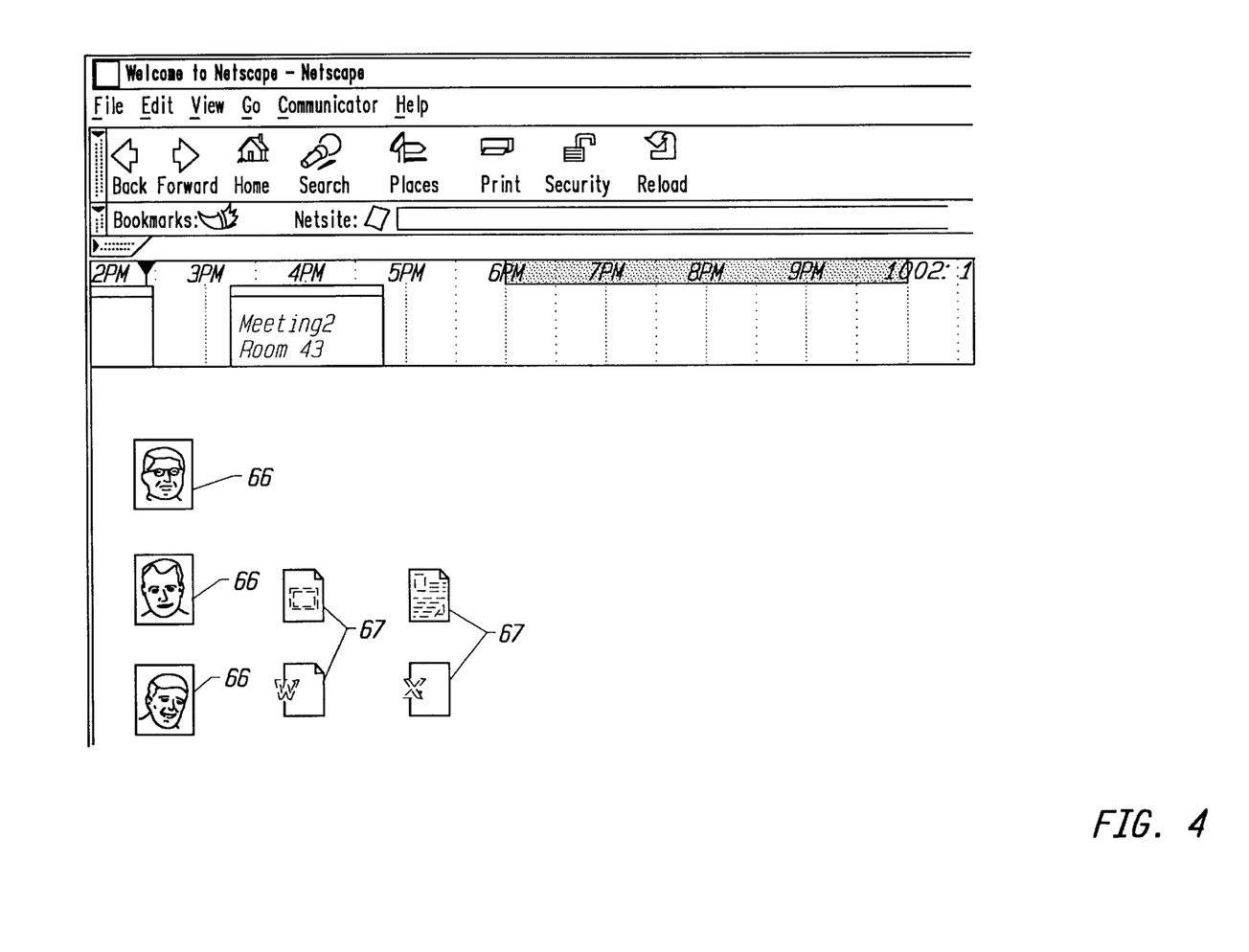
FIG. 4 is a schematic representation of a browser in which a day's schedule is displayed according to the invention.

FIG. 4 is a schematic representation of a browser in which a day's schedule is displayed according to the invention. If the user inquires about all the events for the day, the complete schedule for the day can be opened, revealing detailed information for all the meetings in that time frame. In the example provided on FIG. 4, a photograph 66 of each of the meeting attendees is displayed, as well as iconic indications 67 of resources available for or required at/for the meeting.

Figure 5A:
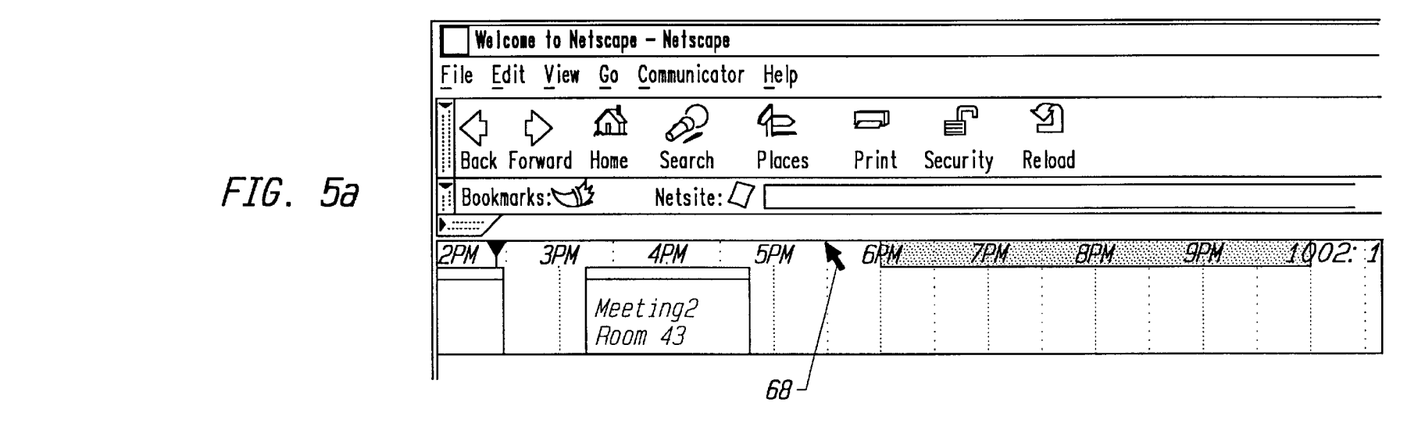
FIGS. 5a and 5b provide a schematic representation of a browser in which a time interval is selected, creating a new event according to the invention.
Figure 5B:
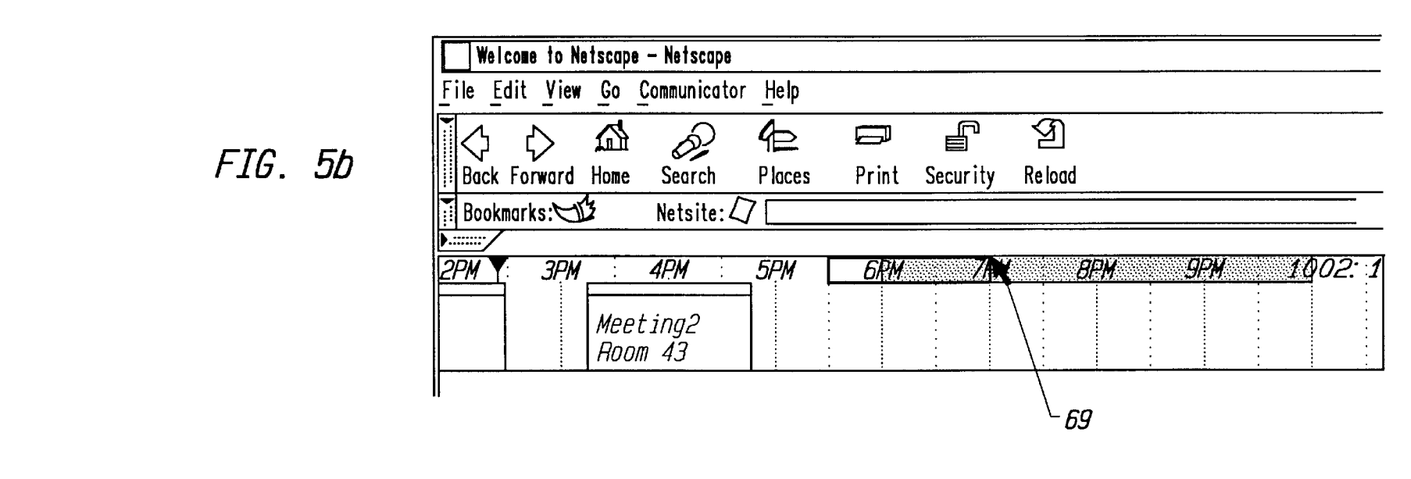

FIGS. 5a and 5b provide a schematic representation of a browser in which a time interval is selected, creating a new event according to the invention. The time line is used to create new events by selecting a "from" time 68 (FIG. 5a) and a "to" time 69 (FIG. 5b) by using the usual selection marquee. A click on the time line selects a particular time point, e.g. to create a deadline.

Figure 6:
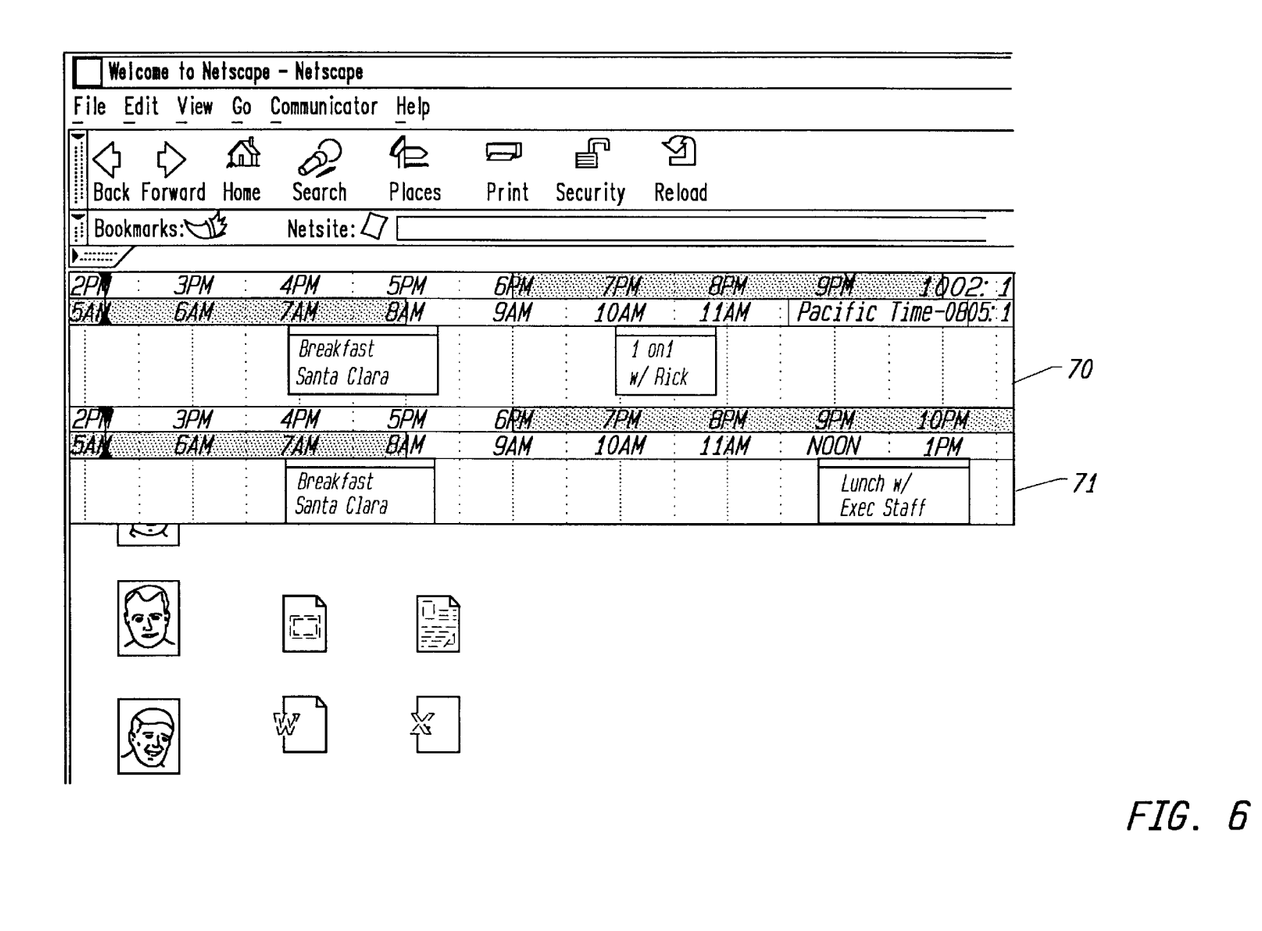
FIG. 6 provides a schematic representation of a browser in which the schedules of various individuals are compared side-by-side according to the invention.

FIG. 6 provides a schematic representation of a browser in which the schedules of various individuals are compared side-by-side according to the invention. To identify scheduling conflicts, e.g. when setting up meetings, it is useful to view the user's own schedule 70 next to another person's schedule 71. This second time line also shows the offset, if the person happens to be in a different time zone. This happens often in globally operating companies, and simplifies scheduling for teleconferences. In current applications this information is often difficult to obtain.

Other days following the current day can be displayed by clicking on the headers with the day names. Month and year displays are also provided by the invention, where weeks and months are shown respectively instead of days. The time line may be used universally to display information on age of documents, and when and by whom they were last modified, as well as making this a view on the user's main display, aligning document icons, indicating when they were created. The time line shows the day, month, or year view, depending on the selection.

Figure 7:
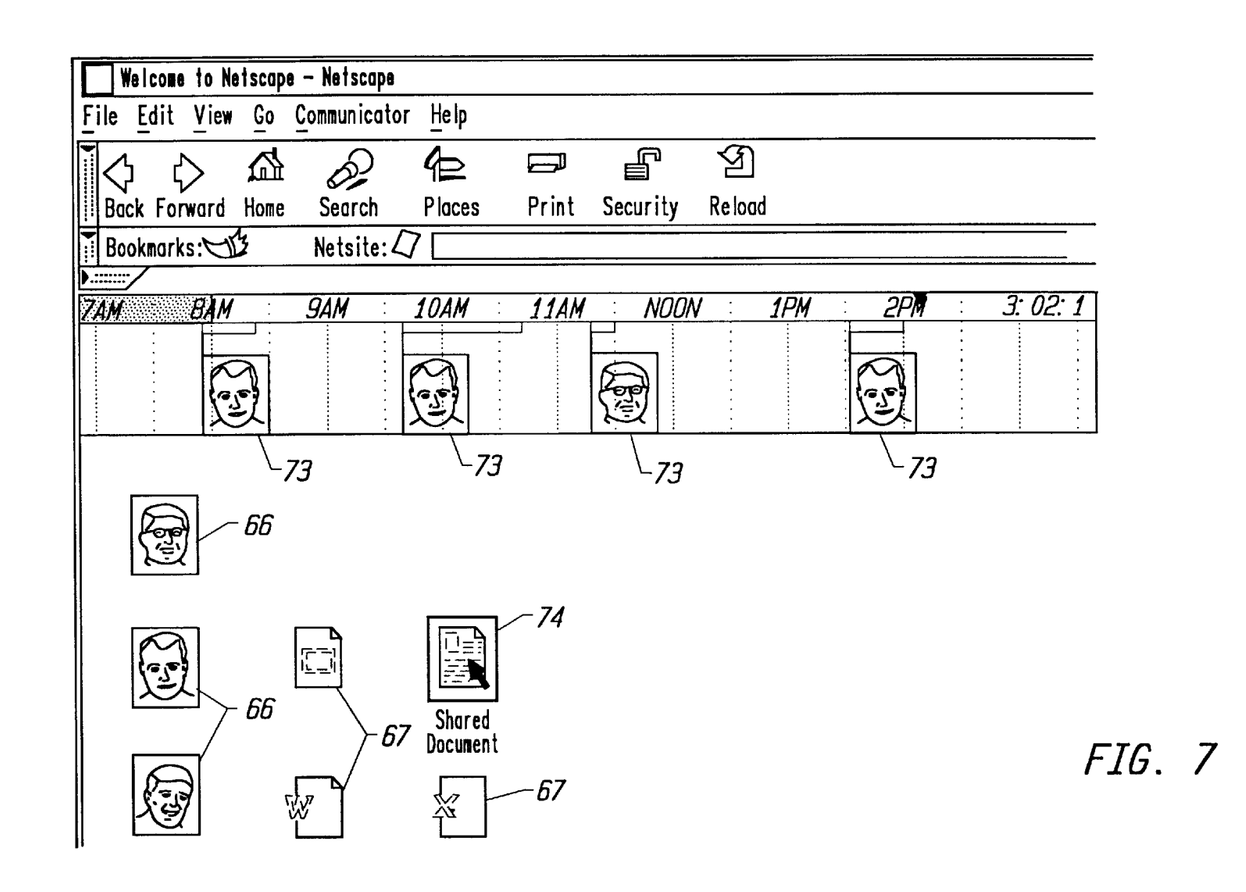
FIG. 7 provides a schematic representation of a browser in which the schedules of various individuals are compared side-by-side, and in which each individual is represented as a persona in the time line according to the invention.

FIG. 7 provides a schematic representation of a browser in which the schedules of various individuals are compared side-by-side, and in which each individual is represented as a persona in the time line according to the invention. Thus, each appointment listed on the time line is accompanied by a photographic persona 73 of the individual with whom the meeting is scheduled. This arrangement provides information at a glance that reinforces the personal nature of the meeting. FIG. 7 also shows a shared document 74 that is to be discussed and/or worked upon during the scheduled meeting.

Figure 8:
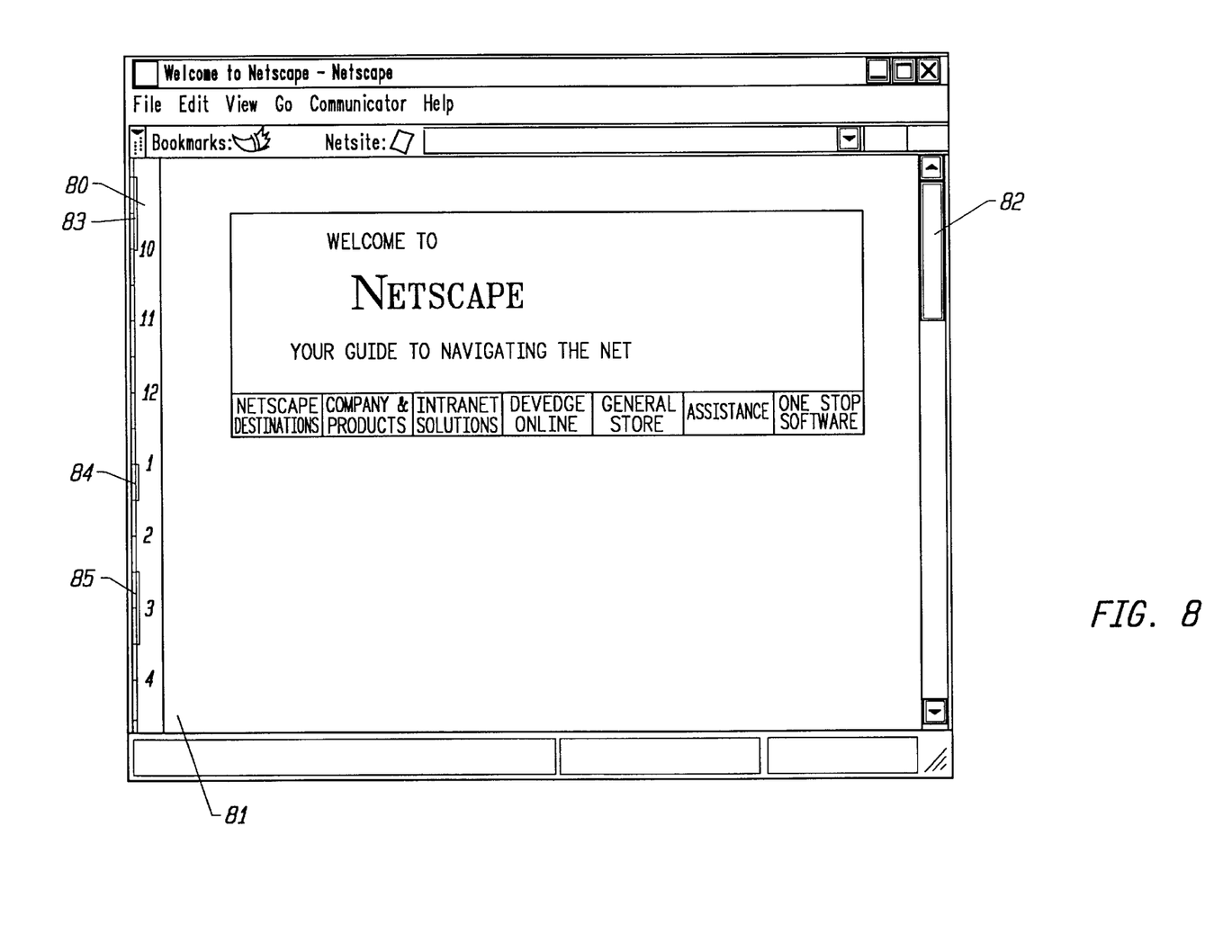
FIG. 8 provides a schematic representation of a browser in which a time line is integrated into a window bounding box according to another, equally preferred embodiment of the invention.

FIG. 8 provides a schematic representation of a browser in which a time line is integrated into a window bounding box according to another, equally preferred embodiment of the invention. An aspect of the invention involves the addition of the time line to the graphic user interface (GUI) of a local computer, such as a personal computer. The invention provides a time lie that performs all time management and scheduling functions and that has access to all local and remote system resources needed to accomplish such function. Accordingly, the invention is seen as an integrated adjunct to any GUI that provides a focal point for all time management and scheduling functions.

FIG. 8 shows that incorporation of the time line 80 into a bounding box of a browser window 81. Several scheduled events 83, 84, 85 are shown on the time line. It is important to note that the time line herein disclosed is extremely versatile. In this example, the time line has been incorporated into the GUI in the same manner as the well known scroll bar 82 tool. Thus, the invention provides a ubiquitous time management and scheduling tool that is readily built into any GUI, e.g. in a bounding box, in a menu bar, and in any of a horizontal or vertical configuration.

Figure 9A:
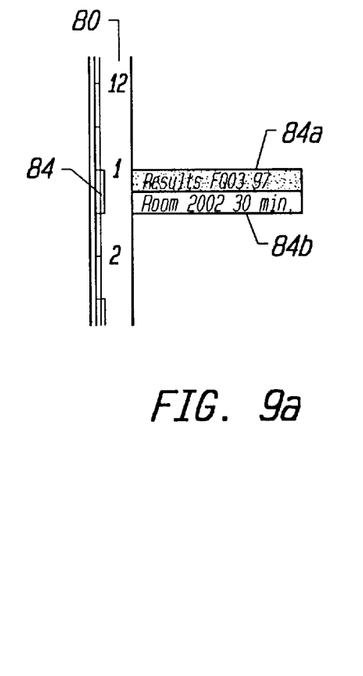
FIGS. 9a and 9b provide a detailed schematic representation of individual and multiple scheduled events as represented on the time line of FIG. 8 according to the invention.
Figure 9B:
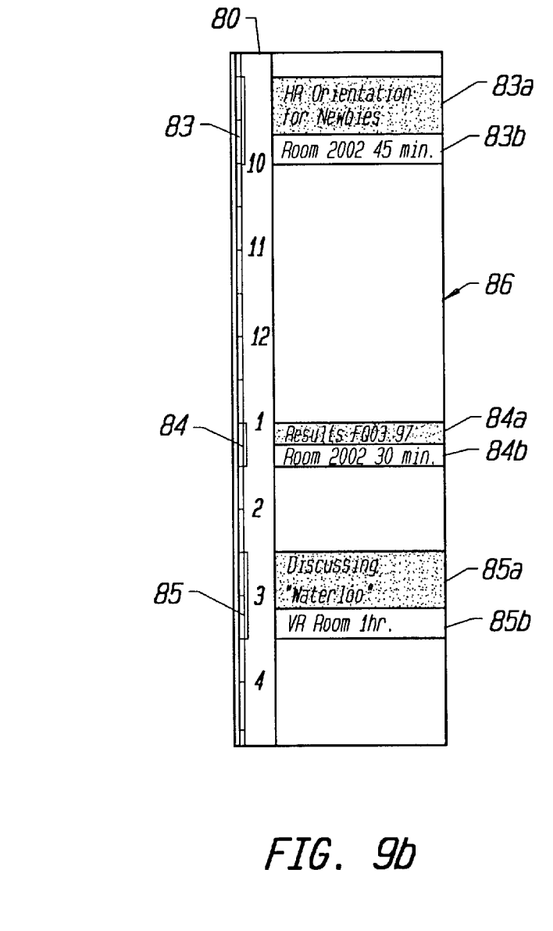

FIGS. 9a and 9b provide a detailed schematic representation of individual and multiple scheduled events as represented on the time line of FIG. 8 according to the invention. As shown on FIG. 9a, an event 84, when selected, provides detailed information in two fields that, in this example, include a topic field 84a, e.g. Results FQ03,97 and a location/duration field, e.g. Room 2002 30 min. It should be appreciated that the actual information provided may also include, for example names of attendees, priority ratings, and travel directions. Further, the information may be displayed in any number of fields, and that the information may be readily edited as desired using standard editing tools.

FIG. 9b shows a time line in which an entire day's events 83, 84, 85 are displayed in detail, e.g. as multiple field entries 83a/83b, 84a/84b, 85a/85b located on a graduated day pallet 86. Typically, the day's events are displayed when an expanded format of the time line is chosen, for example by selecting a "Day" tab (see FIG. 11).

Figure 10:
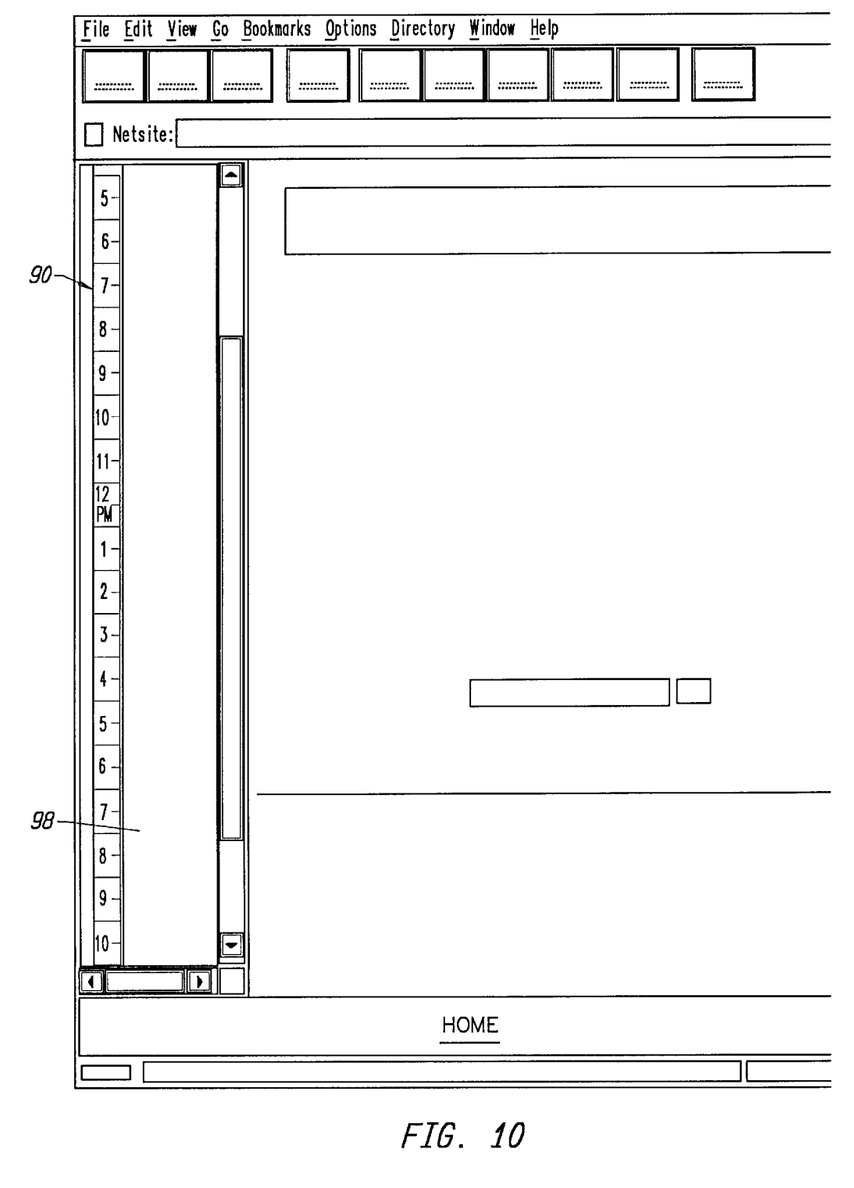
FIG. 10 provides a schematic representation of a browser in which a time line is integrated into a window bounding box according to yet another, equally preferred embodiment of the invention.

FIG. 10 provides a schematic representation of a browser in which a time line is integrated into a window bounding box according to yet another, equally preferred embodiment of the invention. In this embodiment of the invention, the time line 90 has a slightly different appearance than that of those embodiments of the invention discussed above, e.g. the placement of numerals and arrangement of gradations is somewhat different. It will be appreciated that the actual appearance of the time line is readily modified as desired, all within the scope of the invention. As with all other embodiments of the invention, the time line may be stationary or it may move as the day progresses. Thus, the time of day may be indicated by a contrasting portion of the time line and/or by position of the numerals on the time line. In the embodiment shown on FIG. 10, the time of day is shown as the numerals on the time line move upwardly. The embodiment of the invention shown on FIG. 10 also includes a day's event field 98.

Figure 11:
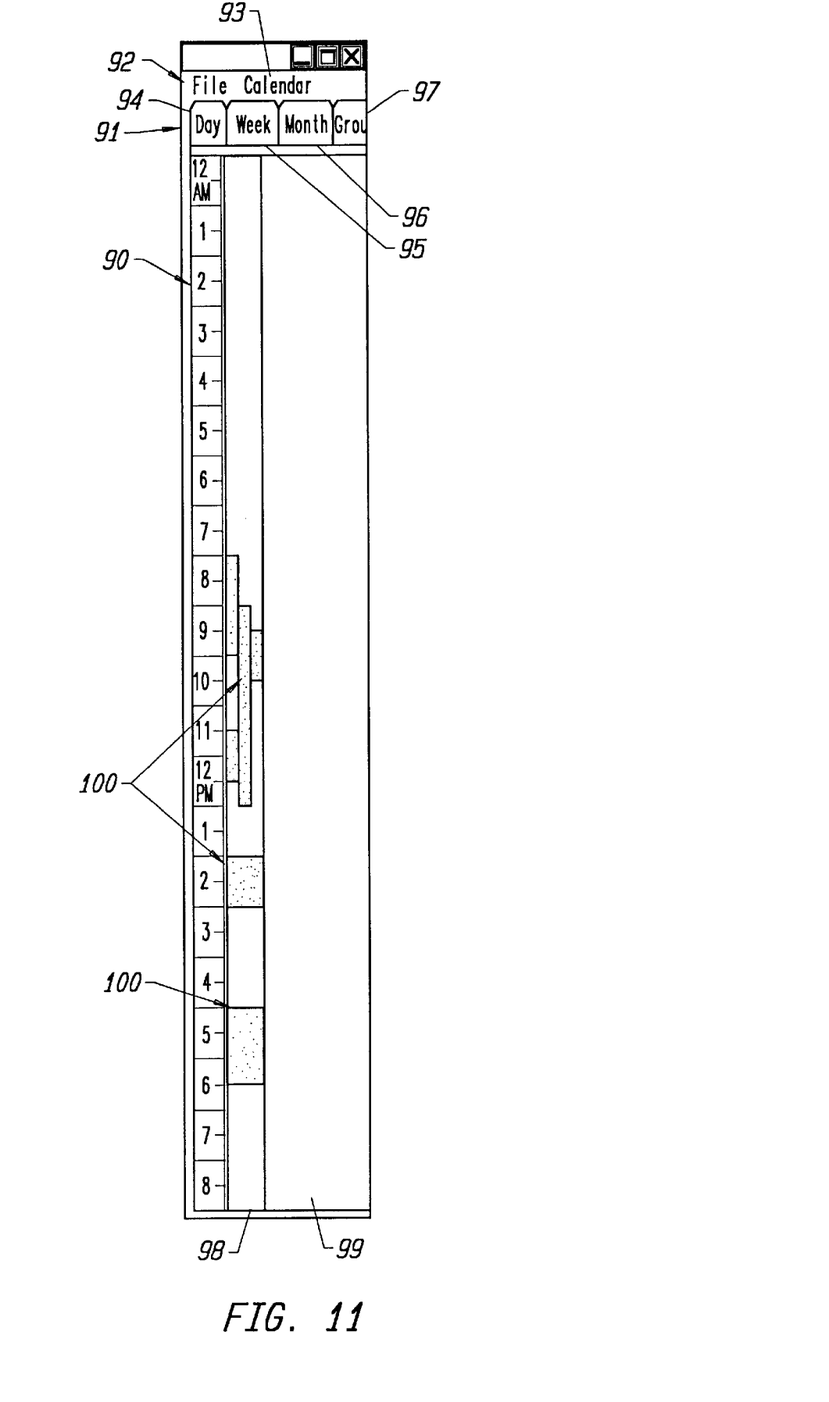
FIG. 11 provides a detailed schematic representation of multiple scheduled events as represented on the time line of FIG. 10 according to the invention.

FIG. 11 provides a detailed schematic representation of multiple scheduled events as represented on the time line of FIG. 10 according to the invention. The scheduled events 100 are shown on the day's event field 98 as bars that indicate beginning time, ending time, and duration of the various events. In this example, the day's event field shows the events for several days side-by-side. There is also a day field 99 (see FIG. 12). FIG. 11 also shows various tabs 911 that allow display of a day window 94, a week window 95, a month window 96, and a group window 97. There is also a menu bar 92 the allows selection of a calendar application 93.

Figure 12:
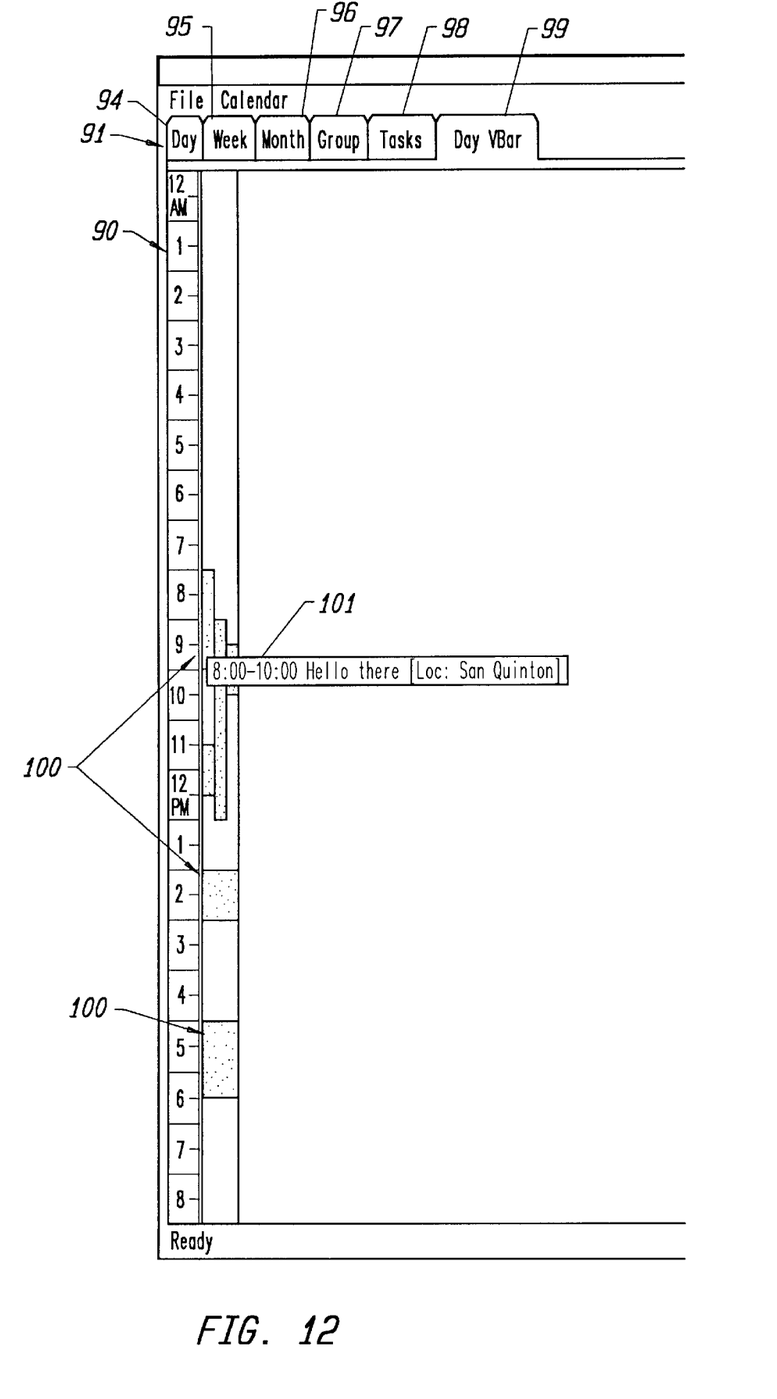
FIG. 12 provides an additional detailed schematic representation of multiple scheduled events, showing particulars of a specific event as represented on the time line of FIG. 10 according to the invention.

FIG. 12 provides an additional detailed schematic representation of multiple scheduled events, showing particulars of a specific event as represented on the time line of FIG. 10 according to the invention. FIG. 12 shows an event 101 this has been selected to provide detailed event information. The format of the displayed information may be as shown, or it may be as discussed above with regard to providing two or more fields. Also shown on FIG. 12 are additional tabs, including a tasks tab 98 and a day window tab 99 which displays the day field 99 when selected.

Figure 13:
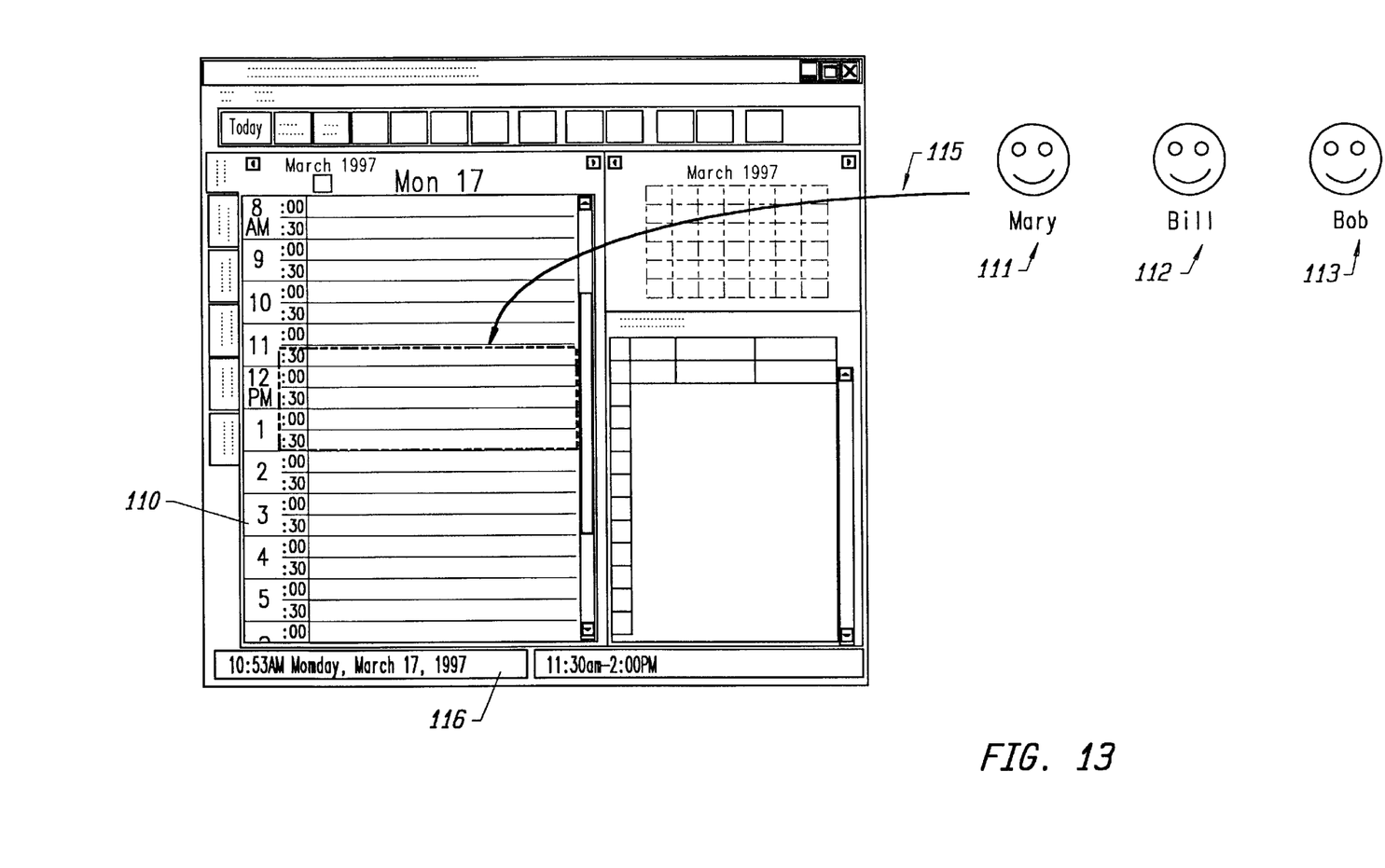
FIG. 13 provides a detailed schematic representation of people and resource encapsulations interacting with the time line of FIG. 10 according to the invention.

FIG. 13 provides a detailed schematic representation of people and resource encapsulations interacting with the time line of FIG. 10 according to the invention.

Consider the time line 110 shown on FIG. 13. Note that the time from 11:30 to 2:00 is selected, the user has used the mouse or keyboard to do this. There are three people encapsulations on FIG. 13 shown as little smiley faces. Mary 111 and Bill 112 are selected (their names are highlighted). Bob 113 is not selected. Bill and Mary are dragged and dropped onto the calendar's time line, as shown by the line identified by the numeric designator 115. This action is interpreted as creating a meeting between the user and Mary and Bill at the time selected. A meeting dialog 116 appears, listing the user, Mary, and Bill as attendees and Mon March 17 from 11:30 to 2:00 as the meeting time. Note that if the time line was not selected (or perhaps not the drop target), this interaction would show Mary and Bill's schedules side by side.

Figure 14:
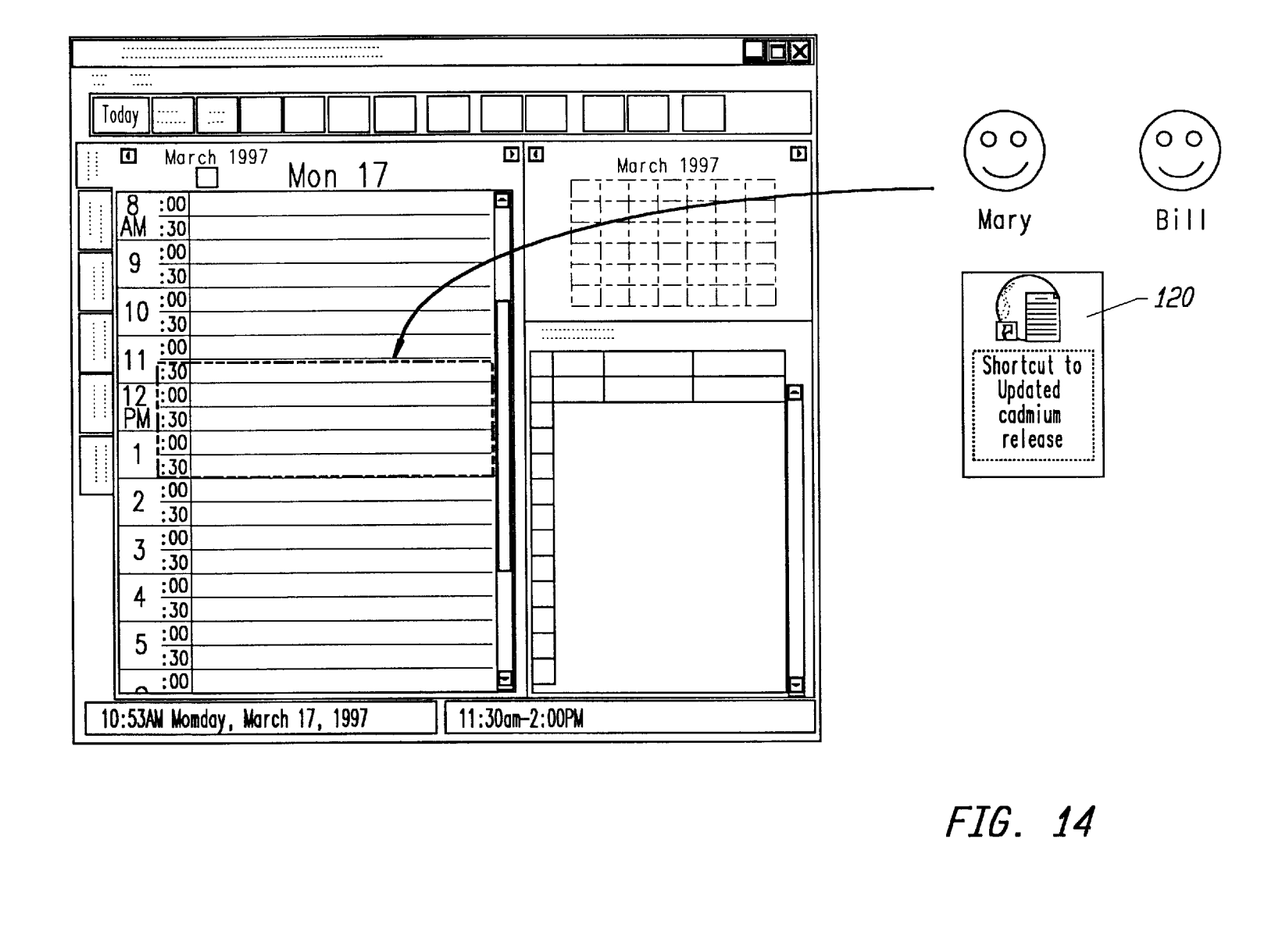
FIG. 14 provides a detailed schematic representation of people and document resource encapsulations interacting with the time line of FIG. 10 according to the invention.

Another variant of this embodiment of the invention involves the addition of a document resource via the desktop. Using Netscape Communications Corp.'s Communicator 4.0, one can create links to Web pages and mail messages that appear as icons on the desktop. Thus, one can create a meeting where the date, time, attendees, title, and details of the meeting are all set in a single drag and drop operation. The meeting title is, by default, the subject line of the mail message or the document title of a Web page. The meeting notes are the content of the mail message or Web page. FIG. 14 provides a detailed schematic representation of people and document resource encapsulations interacting with the time line of FIG. 10 according to the invention. On FIG. 14, the user has selected a link 120 to the mail message, in addition to Mary and Bill. All three encapsulations are dragged and dropped onto a selected time to create the meeting.

Figure 15:
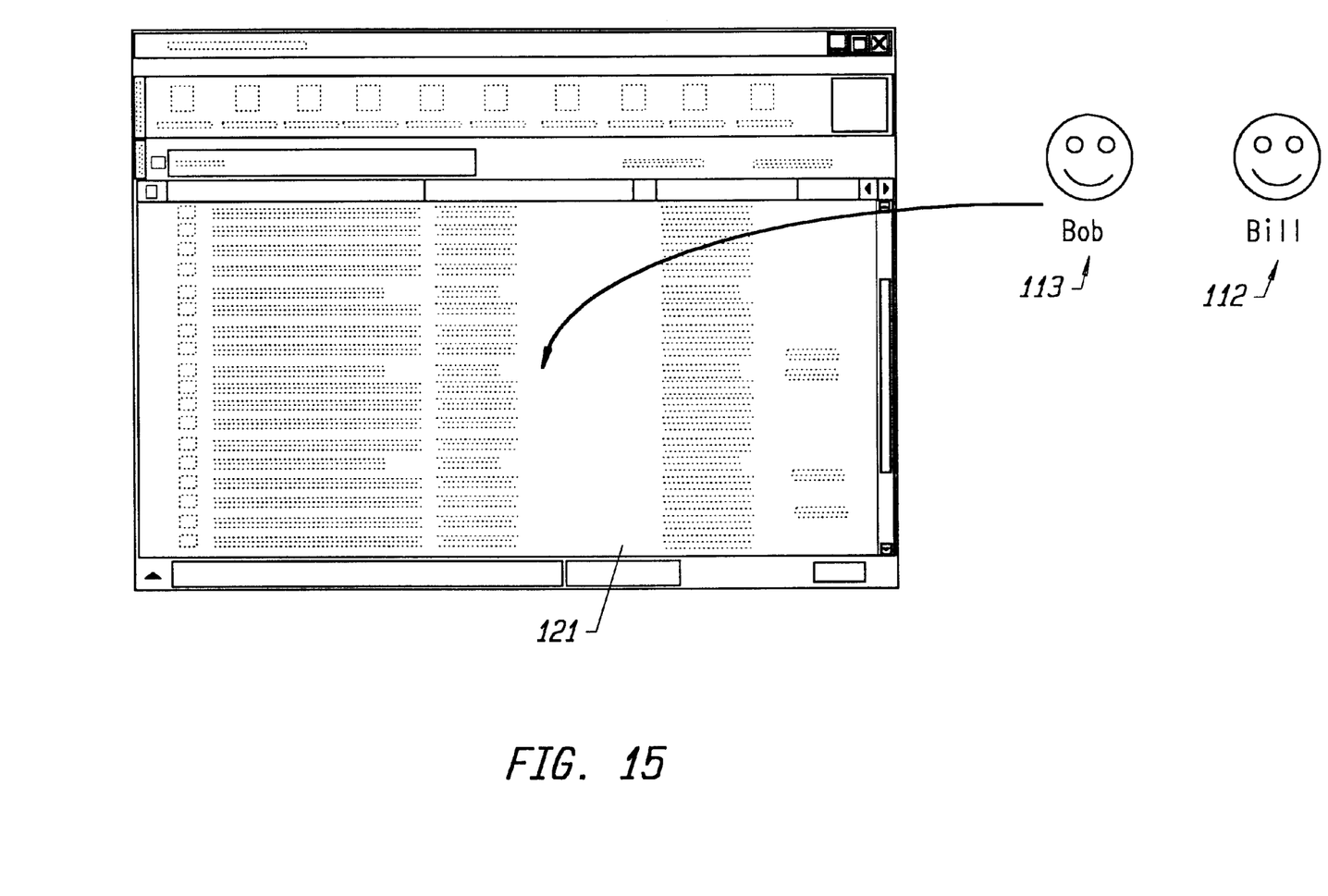
FIG. 15 provides a detailed schematic representation of people and resource encapsulations interacting with a mail user interface according to the invention.

FIG. 15 provides a detailed schematic representation of people and resource encapsulations interacting with a mail user interface according to the invention. This operation is similar the scheduling examples discussed above in connection with FIGS. 13 and 14, except a person encapsulation 113 is dropped onto a mail Inbox 121. In this case the Inbox responds by highlighting, or by bringing up a list of all messages addressed to Bob. If both Bob and Bill had been selected, the result would be to highlight or list all the messages addressed to either Bob or Bill. If the Sent message folder is selected instead of the Inbox, the response lists or highlights all the messages that were sent to Bob.

The reverse of this operation also provides enhanced functionality to the user. Thus, if the user selects one or more messages from the Inbox, and then drags and drops them onto Bob's encapsulation, the messages are forwarded to Bob.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

We claim:

1. An interface for scheduling, comprising:
a clock associated with a display, said clock having a first display configuration representing a most minimized state of said scheduling interface;
said clock having at least a second display configuration representing an expanded state to provide a time line;
wherein moving a cursor over any particular event line displays event information for that event in the foreground; and
wherein said time line itself moves in accordance with the passage of time to present current time in a most prominent location along said time line.

2. The interface of claim 1, further comprising:
an indicator on said time line that registers current time.

3. The interface of claim 1, further comprising:
highlighted bars that convey information about upcoming events.

4. The interface of claim 3, wherein additional information associated with a particular event may be entered for display in the foreground when the time for an upcoming event arrives.

5. The interface of claim 1, wherein the complete schedule for a day can be opened, revealing detail information for all meetings in that time frame, if said user inquires about all the events for said day.

6. The interface of claim 1, wherein a photograph of each attendee of a meeting is displayed.

7. The interface of claim 1, wherein a time interval is selected, creating a new event by selecting a "from" time and a "to" time by using a selection marquee.

8. The interface of claim 1, wherein a click on said time line selects a particular time point.

9. The interface of claim 1, wherein schedules of various individuals are compared side-by-side to identify scheduling conflicts when setting up meetings.

10. The interface of claim 1, wherein a second time line is provided that shows a time zone offset.

11. The interface of claim 1, wherein said time line displays schedule information for a current day by default; and
wherein schedule information for any preceding or subsequent day can be displayed by clicking on a header in said time line which represents said preceding or subsequent day.

12. The interface of claim 1, wherein month and year displays are provided, wherein weeks and months are shown respectively instead of days.

13. The interface of claim 1, wherein said time line provides means for date stamping an event or an associated document upon any of creation and modification, and optionally for identifying said event or document creator and modifier.

14. The interface of claim 1, wherein said time line is readily built into any GUI in any of a horizontal or vertical configuration.

15. The interface of claim 1, wherein said time line comprises one or more events that, when selected, provide detailed information in one or more information fields.

16. The interface of claim 1, further comprising:

at least one encapsulation that represents resources which can be applied to said time line.

17. The interface of claim 16, said encapsulation including one or more of an electronic address; an on-line calendar; a facsimile number; a voice number; or a surface mail address.

18. The interface of claim 16, wherein said at least one encapsulation is dragged and dropped onto said time line to create a time based activity involving said at least one encapsulation.

19. The interface of claim 16, wherein said encapsulation comprises a document resource.

20. The interface of claim 16, wherein people and resource encapsulations interact with a mail user interface to forward or receive messages.

* * * * *